(12) United States Patent
Cok

(10) Patent No.: US 8,511,575 B2
(45) Date of Patent: Aug. 20, 2013

(54) DIGITAL IMAGE FILE INCLUDING OPTICAL CODE

(75) Inventor: Ronald Steven Cok, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 176 days.

(21) Appl. No.: 13/094,923

(22) Filed: Apr. 27, 2011

(65) Prior Publication Data

US 2012/0273579 A1  Nov. 1, 2012

(51) Int. Cl.
*G06K 19/06* (2006.01)

(52) U.S. Cl.
USPC ........................................... 235/494; 235/454

(58) Field of Classification Search
USPC ..................... 235/454, 494, 462.25
See application file for complete search history.

(56) References Cited

U.S. PATENT DOCUMENTS

| | | | |
|---|---|---|---|
| 6,199,048 B1 | 3/2001 | Hudetz et al. | |
| 6,229,964 B1 | 5/2001 | Bell | |
| 7,123,782 B2 | 10/2006 | Shih et al. | |
| 7,273,175 B2 | 9/2007 | Zhao et al. | |
| 7,551,780 B2 * | 6/2009 | Nudd et al. | 382/190 |
| 7,835,037 B2 | 11/2010 | Koide | |
| 7,841,531 B2 | 11/2010 | Onogi | |
| 7,848,578 B2 | 12/2010 | Suomela et al. | |
| 8,156,115 B1 * | 4/2012 | Erol et al. | 707/728 |
| 2004/0096123 A1 | 5/2004 | Shih et al. | |
| 2007/0153303 A1 * | 7/2007 | Abe et al. | 358/1.8 |
| 2009/0078772 A1 | 3/2009 | Ofeke et al. | |
| 2011/0145068 A1 * | 6/2011 | King et al. | 705/14.55 |
| 2012/0132704 A1 * | 5/2012 | Black | 235/379 |

* cited by examiner

*Primary Examiner* — Daniel St.Cyr

(57) ABSTRACT

A digital image file includes an image portion including a first digital image, an information portion including a second digital image of a digital code encoding information associated with or derived from the first digital image. When rendered visible the second digital image is a machine-readable optical code.

11 Claims, 9 Drawing Sheets

```
10
  ↘
      DIGITAL IMAGE FILE {
6 ↜ {INFORMATION:
      255 255 255;
8 ↜ 255 255 255;
        0   0   0
          .
          .
          .
      }
7 ↜ {IMAGE:
      100 100 255;
18 ↜  90    90 255;
          .
          .
          .
      }
    }
```

```
10
  ↘
      DIGITAL IMAGE FILE {
6 ↜ {INFORMATION:
      CODE PIXEL 1;
8 ↜ CODE PIXEL 2;
      CODE PIXEL 3;
          .
          .
          .
      }
7 ↜ {IMAGE:
      IMAGE PIXEL 1;
18 ↜ IMAGE PIXEL 2;
      IMAGE PIXEL 3;
          .
          .
          .
      }
    }
```

DIGITAL IMAGE FILE {
{INFORMATION: ↙ 6
DATA 1;
DATA 2;
DATA 3;
.
.
.
}
{IMAGE: ↙ 7
PIXEL 1
PIXEL 2
PIXEL 3
.
.
.
}
}

*FIG. 2*
(PRIOR ART)

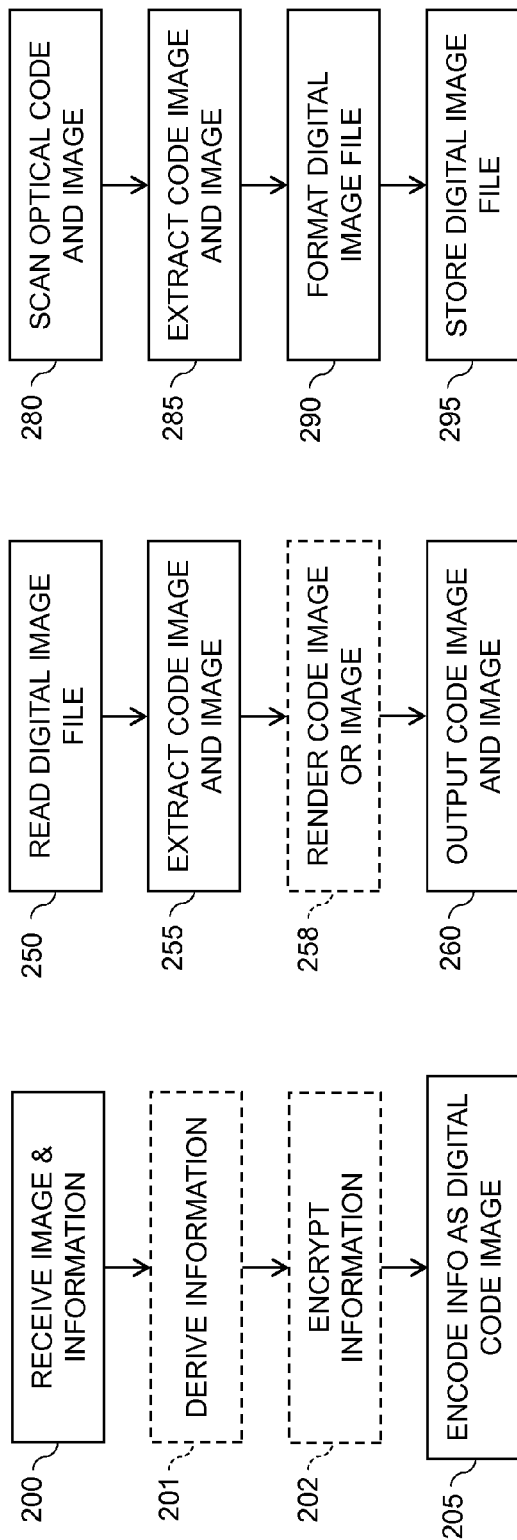

DIGITAL IMAGE FILE INCLUDING OPTICAL CODE

CROSS REFERENCE TO RELATED APPLICATIONS

Reference is made to commonly assigned U.S. patent application Ser. No. 13/094,930 filed Apr. 27, 2011, entitled "Visibly Forming an Image and Optical Code" by Ronald S. Cok and U.S. patent application Ser. No. 13/094,943 filed Apr. 27, 2011, entitled "Producing an Image and Optical Code File" by Ronald S. Cok, the disclosures of which are incorporated herein.

FIELD OF THE INVENTION

The present invention relates to machine-readable optical codes and, more particularly, to the use of machine-readable optical codes with digital image files.

BACKGROUND OF THE INVENTION

Machine-readable optical codes have been in use for many years. The ubiquitous one-dimensional barcode is used for product tracking and to automate purchases. For example, one-dimensional barcodes are in widespread use for managing point-of-sale purchase transactions using computer-controlled laser scanners.

More recently, two-dimensional codes, also known as matrix barcodes, such as QR ("Quick Response") codes, have become popular. Two-dimensional codes can encode a much greater quantity of information than one-dimensional codes. The information encoded in such codes is readily accessed through digital photographs of the codes that are processed by application software found in computers and mobile communication devices such as cell phones having digital signal processing and internet communication access. QR codes are frequently employed in conjunction with product advertising to provide an internet URI website link with information about the product advertised.

Optical bar codes are typically intended to be visually observable by humans, so that humans can find the codes and take appropriate action to access encoded information or otherwise use the codes. In contrast, steganographic information is designed to be hidden within an image. The present invention addresses optical codes that are intended to be observable to humans and does not address steganographic codes. Referring to FIG. 3, a matrix barcode 2 of the prior art is illustrated with dark elements 3 and light elements 4 forming black modules on a white background. As used herein, the term matrix barcode is used synonymously with two-dimensional optical code. A QR code is an example of a matrix barcode. Such codes are machine-readable and are input by a machine (such as a scanner or digital imager), analyzed with image processing equipment and software, and the information encoded in the code decoded, extracted, and used.

The formation, printing, scanning, and decoding of one- and two-dimensional bar codes is known in the art. For example, U.S. Pat. No. 7,273,175 describes a method, apparatus and a storage medium for locating QR codes. An image processing apparatus including an optical reader and image processing hardware is discussed in U.S. Pat. No. 7,835,037. U.S. Pat. No. 7,841,531 discloses a camera operating system and matrix decoding device. U.S. Patent Application Publication 20090078772 describes techniques for decoding images of barcodes. U.S. Pat. No. 6,229,964 addresses an icon reader that reads picture identification data from a data icon on an image print. U.S. Pat. No. 7,123,782 describes using a code printed in association with a printed image to identify an electronic repository for a digital version of the printed image.

Codes on an image print can include a reference to remotely-stored information. A code reader can scan the code, decode the reference, and retrieve the information. For example, U.S. Pat. No. 6,199,048 describes a system and method for using identification codes found on ordinary articles of commerce to access remote computers on a network. In accordance with one embodiment of the invention, a computer is provided having a database that relates Uniform Product Code ("UPC") numbers to Internet network addresses (or "URLs"). To access an Internet resource relating to a particular product, a user enters the product's UPC symbol manually, by swiping a bar code reader over the UPC symbol, or via other suitable input means. The database retrieves the URL corresponding to the UPC code. This location information is then used to access the desired resource.

U.S. Patent Application Publication 20040096123A1 discloses a method and system for locating and accessing digitally stored images including a hard copy print, method and system for producing the hard copy print. The hard copy print has a print side and a back side. The print side has information thereon which identifies the electronic location at which a digital record of the image is accessed electronically. This information is preferably written in a machine readable form so as to permit automatic accessing of the digitally stored images. The system includes a digital storage device for storing of a digital record file of the image on the hard copy print.

Digital images are commonly used to record scenes. It is often the case that information related to the digital image or derived from the digital image, known as image metadata, is used to enhance image presentation or use. The metadata is stored in image databases or as separate files in storage systems. Image metadata can also be directly associated with an image by storing the image metadata in a common file with the image, for example in a file header, wrapper, or other file structure. Referring to FIG. 2, a digital image file 5 includes an information portion 6 and an image portion 7. Binary characters are represented by a descriptive alphabetic description rather than actual data. FIG. 2 uses delimiters such as the open curved bracket character '{', the close curve bracket character '}' and the colon and semicolon characters. Such delimiters are arbitrarily chosen to illustrate a file structure. Many such structures suitable for storage are known in the art or are devised by those skilled in the art, for example extended markup language (XML) files. As long as images are stored in a digital representation, for example as files in an electronic storage system, metadata associated with images is readily saved, retrieved, and used with, or as part of, the files. U.S. Pat. No. 7,848,578 describes capturing visually encoded data along with one or more visual elements, decoding the visually encoded data, and displaying a composite view incorporating both the decoded data and the visual element(s).

However, image metadata is very tedious and difficult to store with printed images. Although the metadata itself can be stored separately from a printed image in an electronic storage system, the association between the printed image and the image metadata can be lost. Alternatively, image metadata is printed with an image on a substrate medium such as paper, for example as text, but retrieving and interpreting the printed information can be difficult. There is a need, therefore, for an alternative structure and method for associating image metadata with an image that has greater utility over a wider variety of media.

SUMMARY OF THE INVENTION

In accordance with the present invention, there is provided a digital image file, comprising:

an image portion including a first digital image;

an information portion including a second digital image of a digital code encoding information associated with or derived from the first digital image; and wherein when rendered visible the second digital image is a machine-readable optical code.

The present invention provides a structure for associating image metadata with an image and provides greater utility for storing and retrieving images and associated image information over a wider variety of media. In particular, the present invention provides a way to associate metadata with an image in printed form and to convert printed metadata to digital metadata and vice versa in a robust, efficient, and low-cost manner.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. Many of the elements described as related to a particular embodiment can be used together with, and possibly interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein:

FIG. 1A is a digital image file representation showing 8-bit three-element pixel values according to an embodiment of the present invention;

FIG. 1B is a digital image file representation showing alphabetic descriptive pixel values according to an embodiment of the present invention;

FIG. 2 is a prior-art digital image file with a metadata header;

FIG. 9 is a flow diagram of a method according to an embodiment of the present invention;

FIG. 10 is a flow diagram of a method according to an embodiment of the present invention; and FIG. 11 is a flow diagram of a method according to an embodiment of the present invention.

DETAILED DESCRIPTION OF THE INVENTION

Figure 1C:
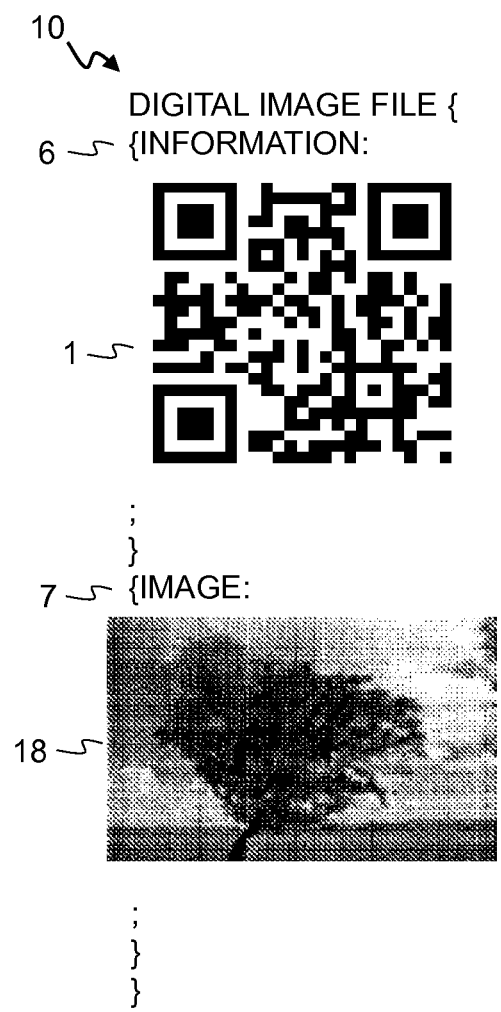
FIG. 1C is a digital image file representation showing embedded images according to an embodiment of the present invention.
Figure 3:
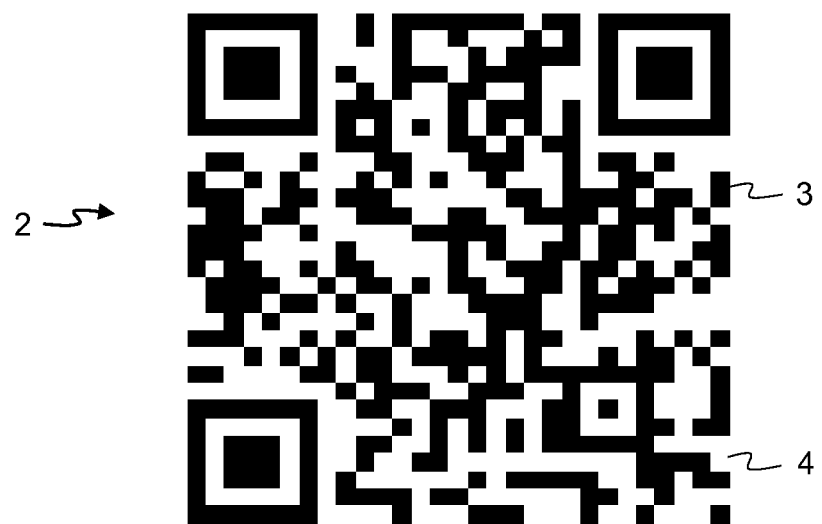
FIG. 3 is a prior-art representation of a two-dimensional optical matrix QR barcode.

Referring to FIGS. 1A-1C according to an embodiment of the present invention, a digital image file 10 includes an information portion 6 and an image portion 7. The image portion 7 includes a first digital image 18. The information portion 6 includes a second digital image 8 of a digital code that encodes information associated with or derived from the first digital image 18. When rendered visible the second digital image 8 is a machine-readable optical code 1.

As is well understood in the computer science arts, a digital file stores information with binary codes in a storage medium, for example a solid-state memory or rotating magnetic or optical disk. The binary codes can represent an image expressed as 8-bit values (i.e. bytes having values of 0-255) or, for black and white images, as 1-bit values separated by arbitrarily selected delimiters. In FIG. 1A, the binary codes in the digital image file 10 corresponding to the information portion 6 having the second digital image 8 of the machine-readable optical code 1 and the image portion 7 including the first digital image 18 are illustrated as bytes associated in groups of three, each group of three bytes specifying a pixel (e.g. a red value, a green value, and a blue value) in the corresponding image, delimited by semicolons. For a binary digital image, the three-byte pixels can be replaced with a single-bit pixel (a '1' or a '0'), thereby greatly reducing the second digital image 8 size. Each portion (6, 7) is delimited by curved bracket characters and the portion type indicated with a character string naming the portion (e.g. "Information" portion and "Image" portion corresponding to the information portion 6 and image portion 7, respectively. FIG. 1B represents the same first and second digital image 18, 8 values as descriptive pixels. FIG. 1C represents the same first and second digital image 18, 8 values as visibly rendered images. FIGS. 1A, 1B, and 1C are different representations of the same information. FIG. 1C illustrates the visibly rendered forms of the first and second digital images 8, 18. The second digital image 8 and the machine-readable optical code 1 are distinguished herein to distinguish between the digital form of the second digital image 8 and the visibly rendered form of the second digital image 8 as the machine-readable optical code 1.

The information portion 6 of the digital image file 10 stores the machine-readable optical code 1 as a second digital image 8 of a digital code encoding first digital image 18 information. Thus, the information is encoded in the machine-readable optical code 1. The information is not stored as a text string (e.g. using ASCII or Unicode character representations), as is commonly found in the prior art.

The digital code is a digital structure that encodes information. The digital code is stored as the second digital image 8 within a digital storage medium, such as a memory, that is accessed by a digital computer. When the second digital image 8 of the digital code is rendered visible, for example by printing or displaying the digital code on a substrate or displaying the digital code on a display, the second digital image 8 of the digital code is made visible in the form of the machine-readable optical code 1. To render a digital image visible is to transform the digital image pixels to a form suitable for output on an output device and to output the rendered digital information on the output device so that it is visible, for example it is viewed by an observer as a print on a substrate or as an image on a display device (e.g. a flat-screen LCD display). Software and processors for reading digital image files from a storage device and rendering images on output devices such as printers or displays are well known in the art, as are the output devices.

The machine-readable optical code 1 encodes information. According to an embodiment of the present invention, the machine-readable optical code 1 encodes information associated with or derived from the first digital image 18, for example image metadata. Such derived or associated information can include image attributes, image pixel statistics, image object information, a universal resource indicator (URI), or semantic image information. Optionally, the information is encrypted so that when the machine-readable optical code 1 is decoded, the resulting decoded information is encrypted.

In various embodiments of the present invention, the machine-readable optical code 1 is a one-dimensional code, a two-dimensional code, a matrix code, a barcode, or a QR code. In another embodiment of the present invention, multiple second digital images 8 of machine-readable optical codes 1 are included in the information portion 6. The information encoded in such machine-readable optical codes 1 can reference other information relevant to the first digital image 18, such as related audio or video files, or additional metadata information. In other embodiments, the information portion 6 of the digital image file 10 includes a plurality of second digital images 8 of corresponding digital codes, wherein each digital code encodes information associated with or derived from the first digital image 18 and when the corresponding second digital images 8 are rendered visible become machine-readable optical codes 1.

According to a method of the present invention and as illustrated in FIG. 9, the digital image file 10 of the present invention is made and stored using suitable systems for such processing and storing operations as are described further below with respect to FIGS. 5-8. In step 200 of FIG. 9, information and the first digital image 18 is received by using a processor 110, 34 to receive the first digital image 18 and information, for example by reading from a storage device such as a memory or through a computer network communication. In an embodiment, the information is received by analyzing the received first digital image 18, for example by using the processor 110, 34 to perform image operations upon the received first digital image 18 or by receiving the information from another source connected to a computer network with the processor 110, 34. Similarly, the received first digital image 18 is received from a digital photograph of a scene or receiving an image file from another source.

In optional step 201, information is derived from the received image. For example, the processor 110, 34 is used to analyze the first digital image 18 to produce information derived from the first digital image 18. The digital code is produced using the derived information. Processors and image processing algorithms for extracting image information from images are known in the prior art, as are software programs that execute on processors to produce digital codes that, when rendered visible, form machine-readable optical codes 1. In a further optional step, the encoded information is encrypted (step 202).

The information is encoded with the processor (110 or 34 in FIG. 5 or 6) as a digital code and rendered as the second digital image 8 of the digital code, that when rendered visible is the machine-readable optical code 1 in step 205. In various embodiments, the processor 110, 34 can encode the information as a one-dimensional code, a two-dimensional code, a matrix code, a barcode, or a QR code. The two digital images (first digital image 18 and second digital image 8) are formatted in the digital image file 10 in step 210 with the information portion 6 including the second digital image 8 of the machine-readable optical code 1 and with the image portion 7 including the first digital image 18. Formatting and structuring digital image files is well known in the computer science art, for example by writing the information in the desired structure in a memory 40.

Using the processor 110, 34, the formatted digital image file 10 is then stored in step 215 in a storage medium, for example in a solid-state memory, a magnetic disk memory, or an optical disk drive 44. Such storage operations are well-known in the computer science and computer hardware arts. Once stored, the digital image file 10 can be communicated (step 220) or transported to any desired location or for a desired purpose.

When it is desired to use the information or first digital image 18, the processor 110, 34 is used to read the stored digital image file 10 and extract the encoded information in the second digital image 8 or the first digital image 18 from the digital image file 10.

In a further embodiment of the present invention, the processor 110, 34 forms a plurality of second digital images 8 of a corresponding plurality of digital codes that each encode information associated with or derived from the first digital image 18 and that when rendered visible are machine-readable optical codes 1. The processor 110, 34 stores the second digital images 8 in the information portion 6 of the digital image file 10.

According to a further embodiment of the present invention and as illustrated in FIG. 10, the first digital image 18 and second digital image 8 are rendered visible and output on to a medium that enables a viewer, user, or image input device to directly perceive the first digital image 18 or to directly perceive the second digital image 8 as the machine-readable optical code 1. The present invention includes a method of forming a visual output of the digital image file 10, including using the processor 110, 34 to read (step 250) the digital image file 10 from a storage medium e.g. hard drive 42, the digital image file 10 having the image portion 7 including the first digital image 18 and the information portion 6 including the second digital image 8 of a digital code that encodes information associated with or derived from the first digital image 18. The second digital image 8 of the digital code and the first digital image 18 are extracted (step 255) from a storage medium, for example by reading the corresponding portions of the digital image file 10 from a memory 40 with the processor 110, 34. The first and second digital images 18, 8 are rendered (step 258) for visual output on a desired visual output device. The visual output device (an output system 28 or a local display 66) is used to produce (step 260) a visual output of the first digital image 18 in spatial association with the second digital image 8, from the rendered first and second digital images 18, 8, the rendered and visually output second digital image 8 being the machine-readable optical code 1. In various embodiments, in spatial association means that the first and second digital images 18, 8 are formed on a common substrate adjacent to each other or are closer to each other than to other digital images on the same substrate.

In an embodiment of the present invention, the encoded information is encrypted and a method of the present invention includes decrypting the encoded information. In another embodiment, the machine-readable optical code is output as a one-dimensional code, a two-dimensional code, a matrix code, a barcode, or a QR code.

Figure 4:
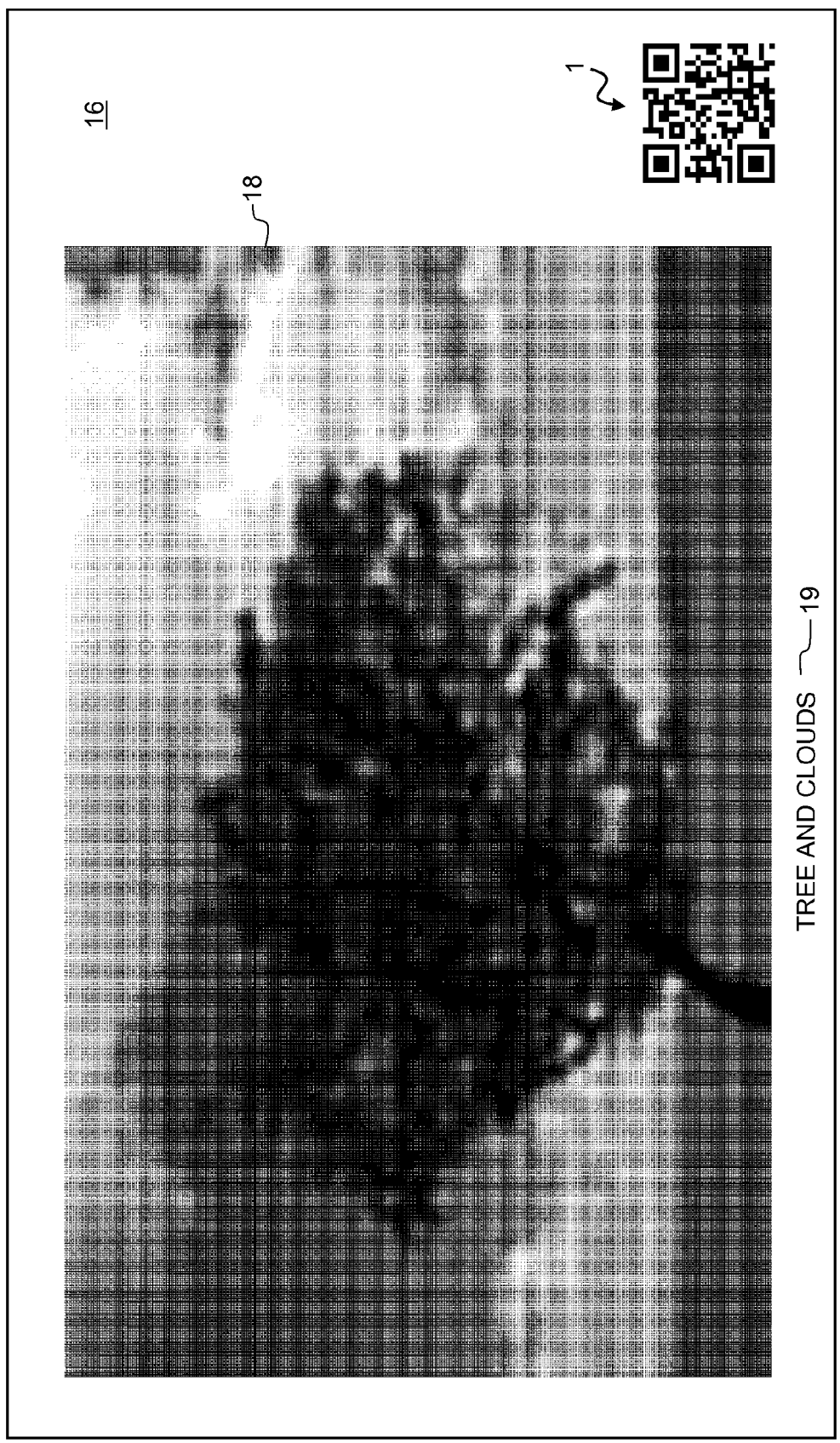
FIG. 4 is an image and machine-readable optical code printed on a substrate useful in understanding the present invention.

In an embodiment of the present invention, the digital image of the machine-readable code 1 and the first digital image 18 are output to the same substrate. For example as illustrated in FIG. 4, both the machine-readable optical code 1 and the first digital image 18 are printed onto a common substrate 16. The machine-readable code 1 and the first digital image 18 are printed adjacent to each other in spatial association (for example as shown in FIG. 4) or, where multiple images or codes are printed on the common substrate 16, the machine-readable optical code 1 is printed closer to the first digital image 18 on the substrate 16 than to any other image printed on the substrate 16. According to one embodiment of the present invention, the output device is a printer (e.g. an inkjet, thermal, offset, gravure, or electrophotographic printer) and the substrate 16 is a printable substrate, for example paper or photographic paper. According to another embodiment, the output device is the local display 66 and the substrate 16 is a display substrate, for example a cathode ray tube, a liquid crystal display substrate, a plasma display substrate, an LED display substrate, an OLED display substrate, or an electrophoretic display substrate.

In other embodiments of the present invention, human-readable information indicating an association between the machine-readable optical code 1 and the first digital image 18 or describing the function or contents of the machine-readable optical code 1 is output onto the substrate 16. This can inform a human viewer of the first digital image 18 or machine-readable optical code 1 of the information. In an embodiment, the human-readable information is rendered as text. The human-readable information can be the information, or a portion of the information, encoded in the machine-readable optical code 1.

As is understood in the digital and electronic printing arts, images are rendered when printed. By rendering is meant that an image is converted from one format to another to ensure that the rendered image is suitable for output with a particular visual output device such as a printer or display. Most output devices require that data be converted from, for example, a storage format to a printing format. As an example, text is typically stored as ASCII or Unicode bytes in a stored file, but when printed or displayed, the 8- or 16-bit text values are converted to images of the characters referenced by the ASCII or Unicode values that is printed or displayed. In another example, images are stored in memory in compressed JPEG format. The compressed JPEG image must be decompressed and rendered for a visual output device such as a printer or display. Such compression, decompression, formatting, and rendering are known in the art.

According to a further embodiment of the present invention, therefore, the first digital image 18 or the second digital image 8 of the digital code is rendered for output. Either the first digital image 18 or the second digital image 8 can be compressed when stored in the digital image file 10 and is decompressed (for example by processor 110 or 34) for outputting. In particular, since the machine-readable optical code 1 is typically monochrome and relies on large black or white blocks, an image of the machine-readable optical code 1 (such as second digital image 8) is readily compressible. Rendering and compression and decompression of the second digital image 8 (and first digital image 18) is included in the various methods of the present invention, as is storing the second digital image 8 of the digital code and first digital image 18 in a compressed format in the digital image file 10.

In another embodiment, the information encoded in the digital code is updated, overwritten, or marked with a version number to indicate various features, changes, or history associated with the first digital image 18.

In a further embodiment of the present invention, a scanner is used to scan the machine-readable optical code 1 to produce an image of the machine-readable optical code and a processor is used to decode encoded information in the image. The decoded information can be a URI and the processor used to display information associated with the URI, for example in a web page.

In a further embodiment of the present invention illustrated in FIG. 11, a scanner or digital camera having an image sensor 39, 89, in a method of making the digital image file 10 from the visible first digital image 18 and from the visible second digital image 8 of the machine-readable optical code 1, wherein the machine-readable optical code 1 encodes information associated with or derived from the first digital image 18, the image sensor 39, 89 (step 280) the visible first digital image 18 and the visible second digital image 8 of the machine-readable optical code 1. The machine-readable optical code 1 output is visibly formed on the substrate 16 and the first digital image 8 is visibly formed on the same substrate 16 or a different substrate 16. Substrates 16 can be printable substrates (e.g. paper) or a display substrate (e.g. a flat-screen display). The image sensor 39, 89 can be an area sensor (for example as used in a digital camera) or a linear sensor (as used in a linear scanner).

The second digital image 8 of the machine-readable optical code 1 and the first digital image 18 are extracted (step 285) from the scanned image and structured appropriately (such as in a memory 40) to form the digital image file 10 (step 290, similar to step 210), for example using the processor 34, 110). Using the processor 110, 34, the digital image file 10 is stored (step 295, similar to step 215) with an information portion 6 including a second digital image 8 of the machine-readable optical code 1 that encodes information and with an image portion 7 including the image 18 in a storage medium (such as disk drive 44).

In an embodiment, the scanned second digital image 8 of the machine-readable optical code 1 is processed using image processing algorithms executing on the processor 34, 110, to reduce the data storage needed to store the second digital image 8 of the machine-readable optical code 1 in the information portion 6. In other embodiments, the machine-readable optical code is a one-dimensional code, a two-dimensional code, a matrix code, a barcode, or a QR code. The machine-readable optical code 1 can encode encrypted information.

The present invention provides an advantage in efficiency and robustness in managing image metadata in association with an image, particularly for devices with limited processing or communications ability. At present, images or image metadata, tend to be provided as either digital information or printed data. Printing a digital image converts it to hard copy and scanning the printed image converts it back to a digital image. An equivalent process as suggested by the prior art for converting metadata requires printing the metadata, for example as text, to convert it to hard copy, and then scanning the printed text with a scanner, employing optical recognition software to convert the scanned printed text to a form suitable for digital storage as metadata with a digital image. Optical recognition software is expensive, slow, requires significant computing power, and is error prone.

In contrast, according to the present invention, the metadata information is converted to hard copy by printing it in an encoded form as a machine-readable optical code. Viewers of the image and associated machine-readable optical code can employ commercially available smart phones including digital cameras and decoding software to read the encoded information. Such tools are widely available. When it is desired to recreate a digital form of the image and metadata, the substrate on which they are output is scanned. Existing tools for extracting images and images of codes are readily available. The extracted images are then structured as desired and stored as a digital image file 10.

Metadata can be stored in a digital image file 10 in a conventional text form and then to encode the metadata as the machine-readable optical code 1 for printing. When the machine-readable optical code 1 is scanned, the metadata is extracted using optical character recognition and stored in textual form to complete the process. However, this process requires that tools for encoding and decoding the machine-readable optical code 1 be present in the printers and scanners employed to print or scan the machine-readable optical code 1. Although such tools are readily available in mobile communication devices such as smart phones, they are not present in typical printers and most scanners.

Hence, according to the present invention, the encoded information is stored in the information portion 6 as the second digital image 8 of the digital code that, when rendered visibly produces the machine-readable optical code 1. The machine-readable optical code 1 can be printed using the same hardware and software tools as the first digital image 18 without requiring additional tools. Likewise, when scanning the first digital image 18 and machine-readable optical code 1, only the image extraction tools (e.g. locating the images and cropping them) are needed. No character-recognition software, digital code formation tools, or other analysis tools are needed. The extracted digital images (188) are structured and stored as described above.

The present invention therefore, provides a simple and robust way to associate image metadata (or other information) with an image in both a digital file form and in a hard-copy printed form, or on a display. Thus, image metadata associated with an image is converted from digital form to printed form and back to digital form in a robust, low-cost, and efficient manner.

In various embodiments of the present invention, the machine-readable optical code 1 is a one-dimensional barcode, a two-dimensional matrix barcode, or a QR code. In other embodiments the image is a color image or a black-and-white image or other image known in the art. For example, as shown in FIGS. 1C and 4, the image is an image of a tree and the machine-readable optical code is a QR code. However, the present invention is not limited to any particular embodiment of the machine-readable optical code 1 or image or class of images.

In one embodiment of the present invention, the substrate 16 is a printable substrate, for example paper, photographic paper, cloth or any surface capable of receiving marks from an image marking engine. In another embodiment of the present invention, the substrate 16 is a display substrate controlled by a display device.

Figure 5:
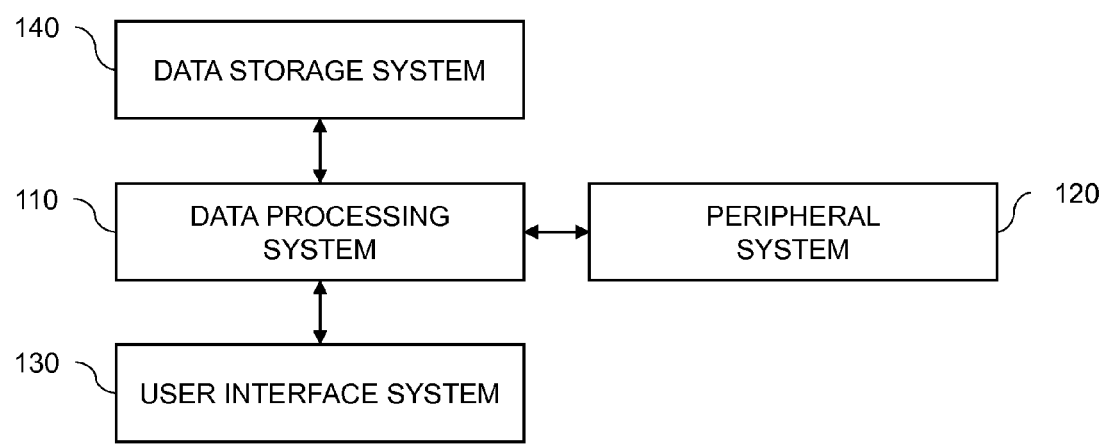
FIG. 5 is a schematic of a system useful in various embodiments of the present invention.

FIG. 5 is a high-level diagram showing the components of a system useful for reading, using, and writing digital image files 10 according to various embodiments of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 can be a distributed processor-accessible memory system including multiple processor-accessible memories communicatively connected to the data processing system 110 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 can be stored completely or partially within the data processing system 110. Further in this regard, although the peripheral system 120 and the user interface system 130 are shown separately from the data processing system 110, one skilled in the art will appreciate that one or both of such systems can be stored completely or partially within the data processing system 110.

The peripheral system 120 can include one or more devices configured to provide digital content records to the data processing system 110. For example, the peripheral system 120 can include digital still cameras, digital video cameras, cellular phones, smart phones, or other data processors. The data processing system 110, upon receipt of digital content records from a device in the peripheral system 120, can store such digital content records in the data storage system 140.

The user interface system 130 can include a mouse, a keyboard, another computer, or any device or combination of devices from which data is input to the data processing system 110. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 110. In this regard, if the user interface system 130 includes a processor-accessible memory, such memory can be part of the data storage system 140 even though the user interface system 130 and the data storage system 140 are shown separately in FIG. 5.

Figure 6:
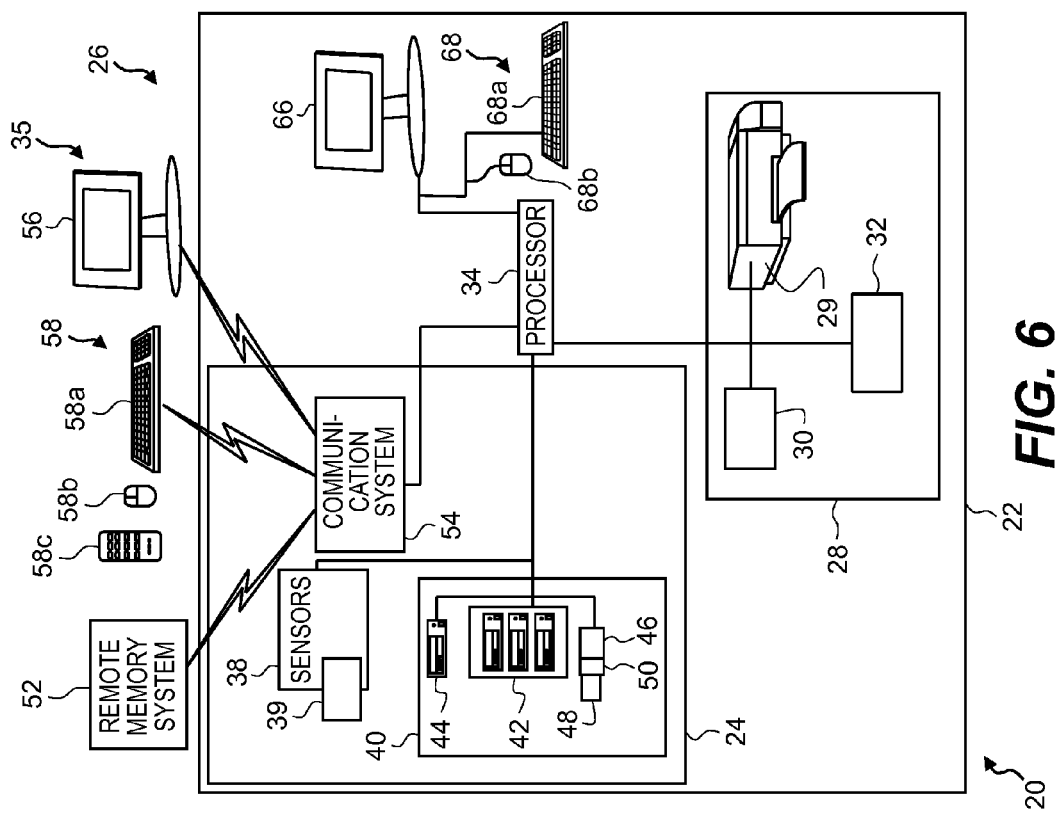
FIG. 6 is an illustration of an embodiment of a computer system useful in various embodiments of the present invention.

As shown in FIG. 6 in more detail, a computer system for efficiently reading, using, and writing digital image files 10 according to various embodiments of the present invention includes an electronic computer system 20, for example a computer server, connected to a remote electronic computer system 35, for example a remote client computer, through a computer network, the electronic computer system 20 including memory 40 for storing one or more digital image files 10 communicated through the computer network to the remote electronic computer system 35, the remote electronic computer system 35 having the display 66 for displaying the digital image files 10 in a graphic user interface.

In the embodiment of FIG. 6, the electronic computer system 20 includes a source of content data files 24, a user input system 26 and an output system 28 connected to the processor 34. The source of content data files 24, user-input system 26 or output system 28 and processor 34 are positioned within a housing 22 as illustrated. In other embodiments, circuits and systems of the source of content data files 24, user input system 26 or output system 28 are positioned in whole or in part outside of housing 22.

The source of content data files 24 can include any form of electronic or other circuit or system that can supply digital data to processor 34 from which processor 34 can derive images for use in forming a digital image file. In this regard, the content data files can include, for example and without limitation, still images, image sequences, video graphics, and computer-generated images. Source of content data files 24 can optionally capture images to create content data for use in content data files by use of capture devices located at, or connected to, electronic computer system 20 or can obtain content data files that have been prepared by or using other devices such as the remote electronic computer system 35. In the embodiment of FIG. 6, source of content data files 24 includes sensors 38, the memory 40 and a communication system 54.

Sensors 38 are optional and can include light sensors, biometric sensors and other sensors known in the art that can be used to detect conditions in the environment of electronic computer system 20 and to convert this information into a form used by processor 34 of electronic computer system 20. Sensors 38 can also include one or more image sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within electronic computer system 20 or it can be removable. In the embodiment of FIG. 6, electronic computer system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as the remote electronic computer system 35, a personal computer, computer network or other digital system. Remote memory system 52 can also include solid-state, magnetic, optical or other data-storage devices.

In the embodiment shown in FIG. 6, electronic computer system 20 has the communication system 54 that in this embodiment is used to communicate with remote electronic computer systems 35 for example including an optional remote memory system 52, an optional remote display 56, or optional remote input 58 (also referred to herein as "remote input 58"). The optional remote memory system 52, optional remote display 56, and optional remote input 58 can all be part of the remote electronic computer system 35 having the remote input 58 with remote input controls, and that can communicate with communication system 54 wirelessly as illustrated or can communicate in a wired fashion. In an alternative embodiment, a local input station including either or both of the local display 66 and local input controls 68 (also referred to herein as "local user input 68") are connected to communication system 54 using a wired or wireless connection.

Communication system 54 can include for example, one or more optical, radio frequency or other transducer circuits or other systems that convert image and other data into a form that is conveyed to a remote device such as the remote memory system 52 or the remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remote electronic computer systems 35 that access the electronic computer system 20 through a web browser. Alternatively, the remote electronic computer system 35 can provide web services to electronic computer system 20 depending on the configurations of the systems.

User input system 26 provides a way for a user 72 of electronic computer system 20 to provide instructions to processor 34. This permits the user 72 to make a designation of content data files to be used in generating a digital image file and to select an output form for an output product or print. User input system 26 can also be used for a variety of other purposes including, but not limited to, permitting the user 72 to arrange, organize and edit content data files to be incorporated into the image-enhanced output product, to provide information about the user or audience, to provide annotation data such as voice and text data, to identify characters in the content data files, and to perform such other interactions with electronic computer system 20 as are described herein.

In this regard user input system 26 can include any form of transducer or other device capable of receiving an input from the user 72 and converting this input into a form used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 6, user input system 26 includes an optional remote input 58 including a remote keyboard 58a, a remote mouse 58b, and a remote control 58*c* and a local user input 68 including a local keyboard 68*a* and a local mouse 68*b*.

Remote input 58 can take a variety of forms, including, but not limited to, the remote keyboard 58*a*, remote mouse 58*b* or remote control handheld device 58*c* illustrated in FIG. 6. Similarly, local user input 68 can take a variety of forms. In the embodiment of FIG. 6, local display 66 and local user input 68 are shown directly connected to processor 34.

Figure 7:
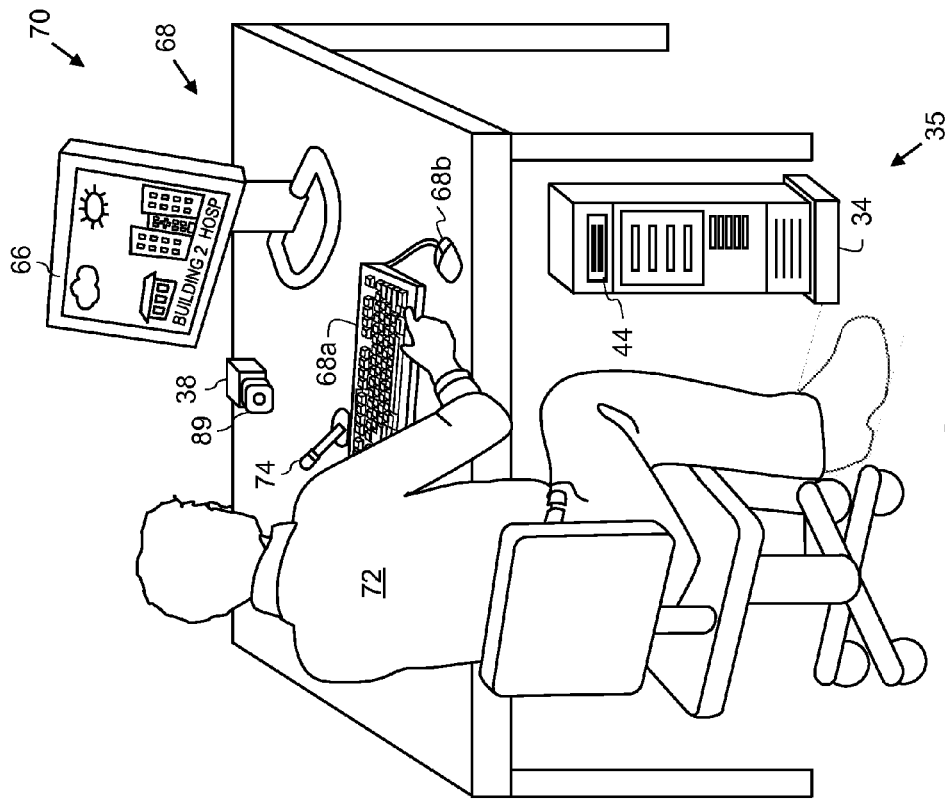
FIG. 7 is an illustration of an embodiment of a desktop computer, work station, or kiosk that can be used in a system of FIG. 6.

As is illustrated in FIG. 7 local user input 68 can take the form of an editing area 70 such as a home computer, an editing studio, or kiosk that can also be the remote electronic computer system 35. In this illustration, the user 72 is seated before a console including local keyboard 68*a* and mouse 68*b* and a local display 66 which is capable, for example, of displaying multimedia content, for example in a graphic user interface. As is also illustrated in FIG. 7, editing area 70 can also have sensors 38 including, but not limited to, image sensors 89, audio sensors 74 and other sensors such as multispectral sensors that can monitor user 72 during a production session or provide other information such as images.

Output system 28 (FIG. 6) is used for rendering images, text or other graphical representations in a manner that permits printing image, text, or other graphical representations. In this regard, output system 28 can include any conventional structure or system that is known for printing or recording images on output device 32 including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not needed and that the claimed methods and apparatuses herein can be practiced with the printer 29 that prints monotone images such as black and white, grayscale, or sepia-toned images. As will be readily understood by those skilled in the art, the electronic computer system 20 can be separated from the remote electronic computer system 35 connected to the printer 29.

In certain embodiments, the source of content data files 24, user input system 26 and output system 28 can share components.

Processor 34 operates electronic computer system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 8:
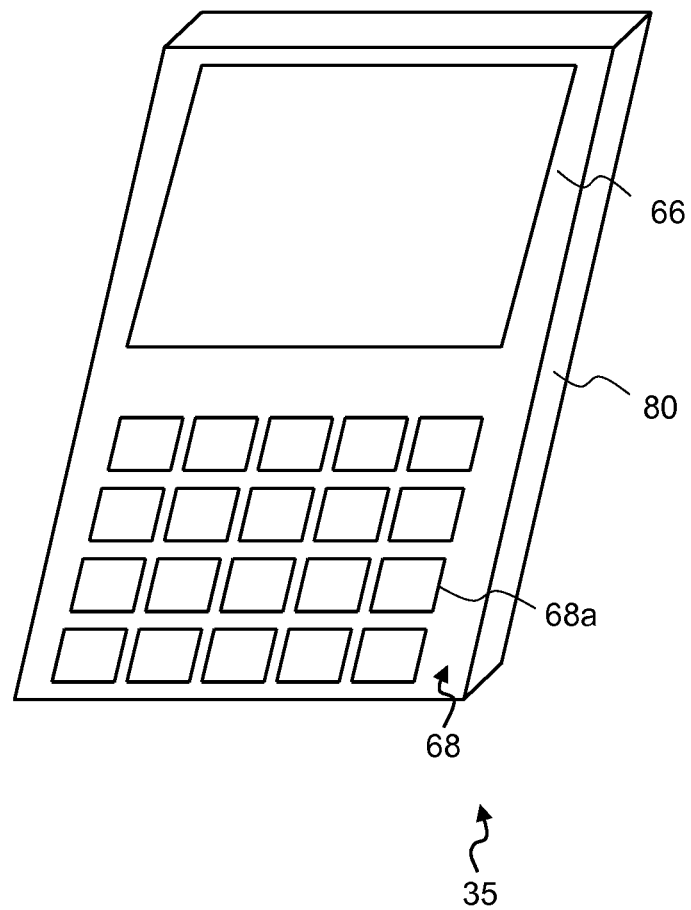
FIG. 8 is an illustration of an embodiment of a mobile communication device that can be used in a system of FIG. 6.

In an embodiment of the present invention illustrated in FIG. 8, the remote electronic computer system 35 is a mobile communication device 80, for example a cellular telephone, a smart phone, or a wirelessly connected hand-held computer such as a tablet computer. The mobile communication device 80 can include the display 66 or the user-input system incorporating the local input 68 keyboard 68*a*. In another embodiment, a local input 68 device is a touch screen. The mobile communication device 80 can communicate with electronic computer system 20 directly, for example through a wireless local area network or a point-to-point wireless connection, or indirectly through a cellular telephony network. The electronic computer system 20 can be a computer server, for example providing browser-based web pages to a remote electronic computer system 35, 80.

Any of the electronic computer system 20, remote electronic computer system 35, or the mobile communication device 80 can execute software programs on the internal processor 110, 34. The software programs can interact with the user 72 through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain embodiments thereof, but it will be understood that variations and modifications can be effected within the spirit and scope of the invention.

Parts List 1 machine-readable optical code
2 two-dimensional code, QR code, matrix bar code
3 dark elements
4 light elements
5 digital image file
6 metadata information portion
7 image information portion
8 second digital image
10 digital image file
16 substrate
18 first digital image
19 human-readable text
20 electronic computer system
22 housing
24 source of content data files
26 user input system
28 output system
29 printer
30 tangible surface
32 output device
34 processor
35 remote electronic computer system
38 sensors
39 image sensors
40 memory
42 hard drive
44 disk drive
46 memory card slot
48 removable memory
50 memory interface
52 remote memory system
54 communication system
56 remote display
58 remote input
58*a* remote keyboard
58*b* remote mouse
58*c* remote control
66 local display
68 local input 68a local keyboard
68b local mouse
70 editing area (home computer, editing studio, or kiosk)
72 user
74 audio sensors
80 mobile communication device
89 image sensor
110 data processing system
120 peripheral system
130 user interface system
140 data storage system
200 obtain image and information step
201 optional derive information step
202 optional encrypt information step
205 encode information as machine-readable optical code step
210 format digital image file step
215 store digital image file step
220 communication digital image file step
250 read digital image file step
255 extract image of code and image step
258 render code image or image step
260 extract image of code and image step
280 scan optical code and image
285 extract image of code and image step
290 format digital image file step
295 store digital image file

The invention claimed is:

1. A digital image file, comprising:
an image portion including a first digital image;
a separate information portion including a second digital image of a digital code encoding information associated with or derived from the first digital image, the second digital image separate and different from the first digital image; and
wherein when rendered visible the second digital image is a machine-readable optical code.

2. The digital image print of claim 1, wherein the encoded information includes image attributes, image pixel statistics, image object information, a URI, or semantic information.

3. The digital image file of claim 1, wherein the encoded information is encrypted.

4. The digital image file of claim 1, wherein the machine-readable optical code is a one-dimensional code, a two-dimensional code, a matrix code, a barcode, or a QR code.

5. The digital image file of claim 1, further comprising a plurality of second digital images of corresponding digital codes encoding information associated with or derived from the first digital image, and wherein when rendered visible the second digital images are machine-readable optical codes.

6. A method of storing a digital image file, comprising:
using a processor to receive a first digital image;
using the processor to form a second digital image of a digital code that encodes information associated with or derived from the first digital image and that when rendered visible is a machine-readable optical code, the second digital image separate and different from the first digital image; and
using the processor to produce the digital image file by storing in a retrievable storage medium the first digital image in an image portion of the digital image file and the second digital image in a separate information portion of the digital image file.

7. The method of claim 6, further including using the processor to extract the information from the second digital image.

8. The method of claim 6, further including encrypting the encoded information.

9. The method of claim 6, using the processor to form the machine-readable optical code as a one-dimensional code, a two-dimensional code, a matrix code, a barcode, or a QR code.

10. The method of claim 6, further comprising using the processor to form a plurality of second digital images of a corresponding plurality of digital codes that each encode information associated with or derived from the first digital image and that when rendered visible are machine-readable optical codes and using the processor to store the second digital images in the information portion of the digital image file.

11. The method of claim 6, using the processor to analyze the first digital image to produce information derived from the first digital image and producing the digital code using the derived information.

* * * * *

UNITED STATES PATENT AND TRADEMARK OFFICE
CERTIFICATE OF CORRECTION

PATENT NO. : 8,511,575 B2  
APPLICATION NO. : 13/094923  
DATED : August 20, 2013  
INVENTOR(S) : Cok Page 1 of 1

It is certified that error appears in the above-identified patent and that said Letters Patent is hereby corrected as shown below:

In the Claims

In Column 15, Line 39, in Claim 2, delete "image print" and insert -- image file --, therefor.

Signed and Sealed this  
First Day of April, 2014

Michelle K. Lee  
*Deputy Director of the United States Patent and Trademark Office*